United States Patent
Embid (10) Patent No.: US 8,324,546 B1
(45) Date of Patent: Dec. 4, 2012

(54) SYSTEM AND METHODS FOR REDUCING DISTORTION AND DEGRADATION IN ADAPTIVE OPTICS TECHNOLOGY

(75) Inventor: Pedro F. Embid, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 443 days.

(21) Appl. No.: 12/700,939

(22) Filed: Feb. 5, 2010

Related U.S. Application Data (60) Provisional application No. 61/206,880, filed on Feb. 5, 2009.

(51) Int. Cl.
*G01J 1/20* (2006.01)
(52) U.S. Cl. .............. 250/201.9; 250/234; 356/494; 356/499; 356/521
(58) Field of Classification Search .......... 250/201.1, 250/201.9, 234; 356/520, 450, 521, 512, 356/496, 515, 499, 494, 488
See application file for complete search history.

(56) References Cited

U.S. PATENT DOCUMENTS

| | | | |
|---|---|---|---|
| 6,498,650 B1 | 12/2002 | Davies | |
| 7,220,001 B2 | 5/2007 | Hillis et al. | |
| 7,232,221 B2 | 6/2007 | Hillis et al. | |
| 7,333,215 B2 | 2/2008 | Smith | |

OTHER PUBLICATIONS

Riera et al., Efficient computation with special functions like the circle polynomials of Zwernike, SPIE 2002 4769-15, Aug. 1, 2002.
Topa, Daniel M., Wavefront reconstruction for the Shack-Hartmann wavefront sensor, SPIE 2002 4769-13, Dec. 13, 2005.
Topa, Daniel M., Optimized methods for focal spot location using center of mass algorithms, SPIE 2002 4769-14, Jul. 10, 2003.

*Primary Examiner* — Francis M Legasse, Jr.
(74) *Attorney, Agent, or Firm* — Valauskas Corder LLC (57) ABSTRACT

A congruence reduction algorithm that forms composite lenslets by reducing data of a plurality of focal spot locations using linear transformations. Use of the congruence reduction algorithm increases the speed of calculations by which corrective elements such as deformable mirrors function, reduces the number of lenslets in an array and improves reconstruction time and focal spot quality.

8 Claims, 3 Drawing Sheets

SYSTEM AND METHODS FOR REDUCING DISTORTION AND DEGRADATION IN ADAPTIVE OPTICS TECHNOLOGY

PRIORITY STATEMENT

This application claims the benefit of U.S. Provisional Application No. 61/206,880, filed Feb. 5, 2009.

FIELD OF INVENTION

The present invention relates generally to optical imaging and more specifically to optical systems that reduce the effects of distortion and degradation thereby improving vision and resolution of optical images.

BACKGROUND OF THE INVENTION

Optical wavefronts are subject to the optical effects of distortion and degradation when passed through certain mediums such as the atmosphere. The atmosphere is subject to turbulence, for example, due to different temperature layers and different winds speeds, to name a few.

Distortion and degradation of optical wavefronts may also occur during reconstruction of the wavefronts by an optical system. This is known as optical aberration wherein imperfections result from image reconstruction. Optical aberrations include what is known as monochromatic and chromatic. A monochromatic aberration is caused by the geometry of the lens used in the optical system whereas chromatic aberrations are caused by dispersion—a failure of the lens to focus all colors to the same convergence point. Specific types of distortion and degradation include what is known as blurring, scintillation, and speckle.

Both turbulence and aberration compromise the vision and resolution of optical images produced by optical systems. Optical systems include, for example, telescopes, microscopes, binoculars, cameras, interferometers and retinal imaging systems.

To improve the performance and reduce distortion and degradation of optical images produced by optical systems, adaptive optics technology is used. More particularly, adaptive optics technology attempts to correct distortions and degradations using a wavefront sensor, a deformable mirror that lies in the optical path, and a computer apparatus that receives input from the wavefront sensor. The wavefront sensor measures distortions and degradations experienced by the wavefront; the computer apparatus uses the measurements to calculate the optimal shape of the deformable mirror to correct the distortions and degradations. More specifically, the deformable mirror includes a plurality of actuators and each actuator is reshaped accordingly in order to reconstruct the wavefront forming the optical image. In order to perform adaptive optics technology correction, the shape of the incoming wavefront must be measured as a function of position.

For example, a telescope used to view a distant star is subject to atmospheric turbulence. The telescope includes a wavefront sensor that includes an array of small lenslets—such as a Shack-Hartmann sensor or a curvature sensor—which operates on wavefronts received by the telescope. The array of lenslets splits up the wavefront into an array of pixels or focal spots. The average wavefront perturbation in each pixel is calculated by a computing apparatus. This pixellated map of the wavefronts is used to adjust the deformable mirror in order to correct the wavefront distortions and degradations introduced by the atmosphere. The deformable mirror corrects the wavefront so that the reconstructed image appears sharp.

Certain current optical systems and methods must perform numerous and burdensome calculations to determine the proper position of the deformable mirror—specifically each actuator—to ultimately reconstruct the object image. These numerous and burdensome calculations may affect the vision and resolution of the reconstructed optical image. What is needed is an optical system and methods that increases the speed of calculations by which corrective elements such as deformable mirrors function, reduces the number of lenslets in an array and improves reconstruction time and focal spot quality. The present invention satisfies this demand through congruence reduction that formulates composite lenslets.

SUMMARY OF THE INVENTION

The present invention is discussed herein with respect to an optical system utilizing adaptive optics technology. The present invention may be applied to optical systems in a variety of technologies, for example vision science such as ophthalmology, satellite surveillance, astronomy, and free space optical communication to name a few.

In one embodiment according to the present invention, the optical system including adaptive optics technology according to the present invention includes a wavefront sensor device, a computer apparatus and a wavefront corrector device.

A wavefront sensor device measures the turbulence or aberrations of an optical wavefront. Wavefront sensor devices include, for example, Hartmann sensor, Shack-Hartmann sensor, Tscherning sensor and curvature sensor. According to the present invention, the wavefront sensor device includes an array of small lenses—or lenslets—that divides the wavefront into an array of pixels on a detector or photon sensor such as a charge couple device ("CCD"), avalanche photodiodes ("APD") or quad-cell.

The lenslet array produces at least one pixel positioned behind each lenslet. When the wavefront passes through the lenslet array, it produces a collection of bright spot elements. A bright spot element is any area of sharp intensity, and is also referred to herein as focal spot.

In typical operation, a reference beam is first imaged and the locations of the focal spots are recorded. Then the object wavefront is imaged and a second set of focal spot locations are recorded. The shift in each focal spot location is computed to obtain what is termed herein as "focal spot data". The focal spot data is proportional to the average of the slopes of the wavefront over the region sampled by the lenslet.

A wavefront corrector device, such as a deformable mirror, lies in the optical path and typically has a surface controlled by a plurality of actuators. The number of actuators determines the number of degrees of freedom—or wavefront inflections—the wavefront corrector device can correct. In one embodiment, the actuators are piezo-electric actuators, but it can be appreciated that any type of actuator may be used such as a microelectromechanical system ("MEMS"). The size of the wavefront corrector device may vary depending on the application, ranging in size from about five centimeters in diameter with approximately twenty actuators, to up to about forty centimeters in diameter with approximately 2,000 actuators.

In many instances, the focal spot data will outnumber the number of actuators of the wavefront corrector device. Therefore, according to the present invention, the computer apparatus includes a congruence reduction algorithm. It is also contemplated that the congruence reduction algorithm may be implemented by the wavefront sensor device.

Congruence reduction, according to the present invention, is a powerful algorithmic tool in wavefront sensing. It allows robust and sensitive wavefront sensor devices to be efficiently combined with any wavefront corrector device such as an adaptive optic adjustable mirror. The present invention allows the lenslet array to perform as if it is a custom array designed for the wavefront corrector device. This preserves the superb wavefront imaging of the wavefront sensor device and combines the benefits of a custom wavefront sensor device designed specifically for the size and layout of the wavefront corrector device and the considerable speed benefits of a smaller lenslet array. The congruence reduction operation is an exact set of linear transformations to form composite lenslets.

The congruence reduction algorithm includes a summation of the focal spot data of continuous groups of lenslets to obtain what is referred to herein as "composite lenslet data". According to the congruence reduction algorithm, a congruence matrix shapes and sculpts the focal spot data received from the wavefront sensor. For example, on a 100 by 100 lenslet array there are 10,000 focal spot locations created on the detector. By combining lenslets such as four lenslets into a single composite lenslet, the computations to obtain focal spot data is reduced to 2,500.

The resolution and the configuration of the lenslet array can be adjusted dynamically. Computational burdens are reduced by combining lenslets of one or more wavefront sensor devices.

The computer apparatus uses the composite lenslet data to manipulate and control the actuators of the wavefront corrector device such that the optical image is reconstructed without distortion and degradation thereby improving vision and resolution of the wavefront or optical image.

It is contemplated that a selection of all or a portion of focal spot data can be subject to the congruence reduction algorithm such that the wavefront can be reconstructed on different levels of resolution.

In one embodiment, the present invention is a method to reduce distortion and degradation within an optical system. A wavefront is introduced to a lenslet array of a wavefront sensor device. The shift in a plurality of focal spots on a detector of the wavefront sensor device are determined to obtain focal spot data, which are processed by a processor of a computer apparatus using a congruence reduction algorithm to form composite lenslet data. The composite lenslet data is utilized to adjust the wavefront corrector device such that the wavefront is reconstructed to produce an optical image of an object.

In another embodiment, the present invention is a system that includes a wavefront sensor device, a computer apparatus and a wavefront corrector device. The wavefront sensor device includes a lenslet array and a detector such that the wavefront is pixellated by the lenslet array into a plurality of focal spots on the detector forming focal spot data. The computer apparatus includes a processor that utilizes a congruence reduction algorithm to form composite lenslet data from the focal spot data and the computer apparatus commands adjustments to the wavefront corrector device according to the composite lenslet data in order to reconstruct the wavefront forming a reconstructed wavefront.

In one embodiment, the congruence reduction algorithm is $X_r = C^T \times C$. In another embodiment, the wavefront sensor device is a Shack-Hartmann sensor device. In yet another embodiment, the wavefront corrector device is a deformable mirror including a plurality of actuators. The computer apparatus commands each actuator of the plurality to adjust according to the composite lenslet data in order to reconstruct the wavefront forming the optical image of an object.

An advantage of the present invention is the ability to dynamically adjust the configuration and resolution of the lenslet array.

Another advantage of the present invention is reducing the computational burden of reconstructing the optical image of the object.

Another advantage of the present invention is matching the geometry of the lenslet array to the actuators, for example, a lenslet array may be etched in a rectangular configuration whereas the actuators may be in a hexagonal configuration.

Another advantage of the present invention is the precise measurement of a distinctive feature, for example, only the cornea of a cone shaped bulge in analyzing kerataconus.

Another advantage of the present invention is multigrid reconstruction, where instant reconstructions can be performed with subsequent reconstructions that require more computational time.

Another advantage of the present invention is the formulation of a simpler single lumped sensor that can be tuned via software to have the properties of a plurality of sensors.

Another advantage of the present invention is to build a sensor with superb resolution and use it as high-resolution system or a low resolution system. This may be particularly useful in feedback systems where low-order corrections made rapidly is more important than high-order corrections made slowly.

Another advantage of the present invention is to sculpt the array to match another device like an adaptive optics corrective mirror. These mirrors have different geometries: polar layouts, hexagonal layouts and Cartesian grid layout to name some. The present invention permits the combining of lenslets to more precisely match any of these sensors.

Another advantage of the present invention is that congruence reduction is hierarchal such that it occurs on different levels of resolution in order to reconstruct sequential reduced data sets.

Yet another advantage of the present invention is that it corrects lower order aberrations as well as higher order aberrations.

The present invention and its attributes and advantages will be further understood and appreciated with reference to the detailed description below of presently contemplated embodiments, taken in conjunction with the accompanying drawings.

DETAILED DESCRIPTION OF EMBODIMENTS OF THE INVENTION

The discussion below in reference to correcting lower order aberrations is merely exemplary. The present invention is also applicable to higher order aberrations as well as turbulence.

Figure 1:
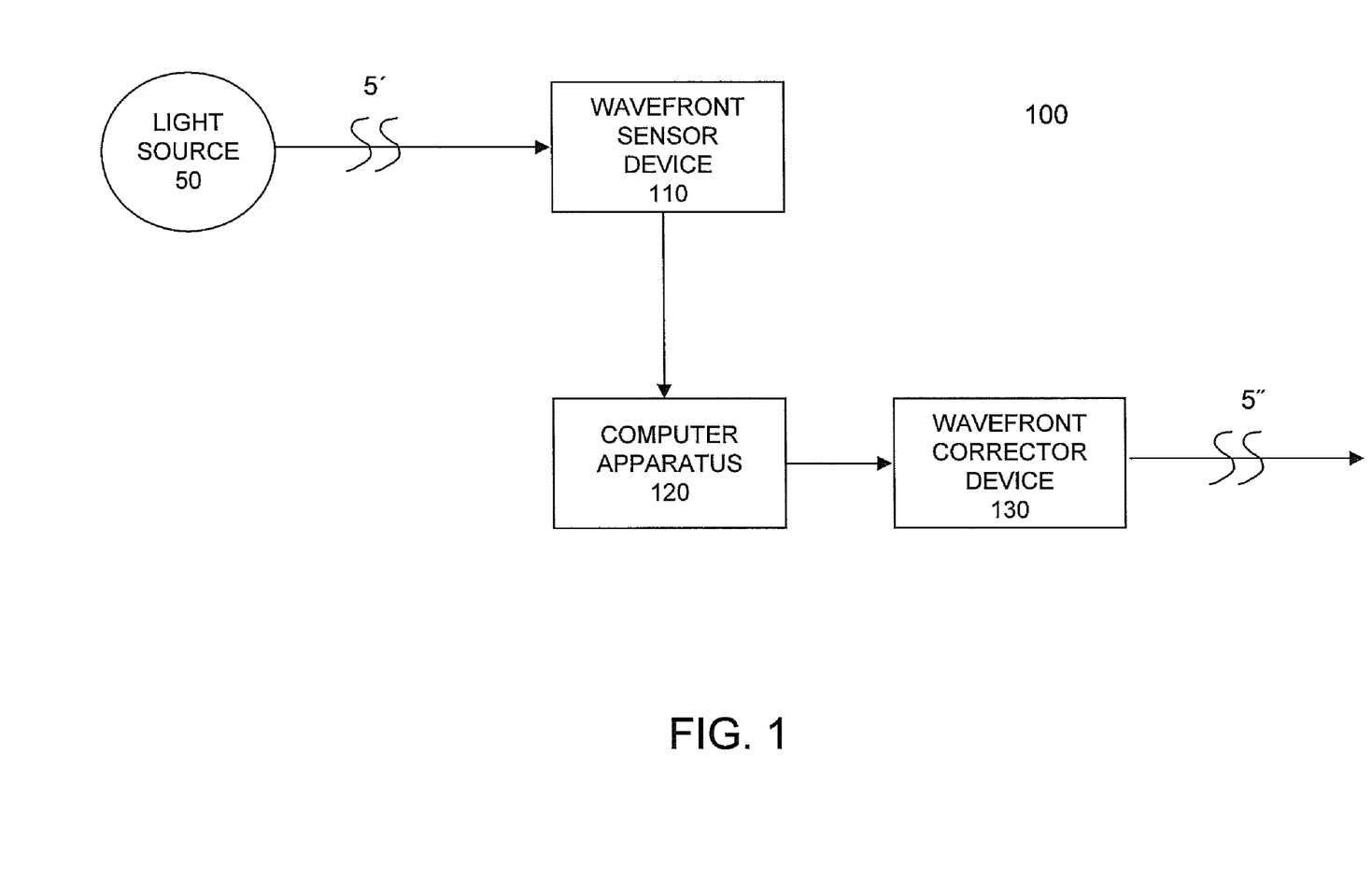
FIG. 1 is a block diagram of an optical system according to the present invention.

An optical system 100 for correcting distortions and degradations in a wavefront 5' in accordance with one embodiment of the present invention is shown in FIG. 1. The system 100 includes a wavefront sensor device 110, computer apparatus 120 and wavefront corrector device 130.

As shown in FIG. 1, a wavefront 5' is received by the wavefront sensor device 110 with use of a light source 50.

Light source 50 may be either natural light such as the sun or artificial light such as a laser or superluminescent diode to name a few. The wavefront sensor device 110 is discussed more fully below with respect to a Shack-Hartmann sensor device, but any wavefront sensor device is contemplated such as a Hartmann, Tscherning or curvature sensor.

According to the embodiment discussed herein, the wavefront corrector device 130 is a deformable mirror that comprises a thin reflective surface controlled by a plurality of actuators. The number of actuators determines the number of degrees of freedom—or wavefront inflections—the wavefront corrector device 130 can correct. According to the discussion herein, the actuators are piezo-electric actuators, but any type of actuator is contemplated.

The computer apparatus 120 connects the wavefront sensor device 110 and the wavefront corrector device 130. The computer apparatus 120 receives focal spot data from the wavefront sensor device 110 and performs calculations on the data to determine exact adjustments to the wavefront corrector device 130 to correct the distortions and degradations in the wavefront 5' to reconstruct a corrected wavefront 5" forming the optical image.

According to the present invention, the calculation performed on the focal spot data includes a congruence reduction algorithm. The congruence reduction algorithm includes a summation of the focal spot data of continuous groups of lenslets to obtain what is referred to herein as "composite lenslet data". Congruence reduction forms composite lenslets by reducing the data using an exact set of linear transformations, discussed more fully with respect to FIG. 2 and FIG. 3.

Figure 2:
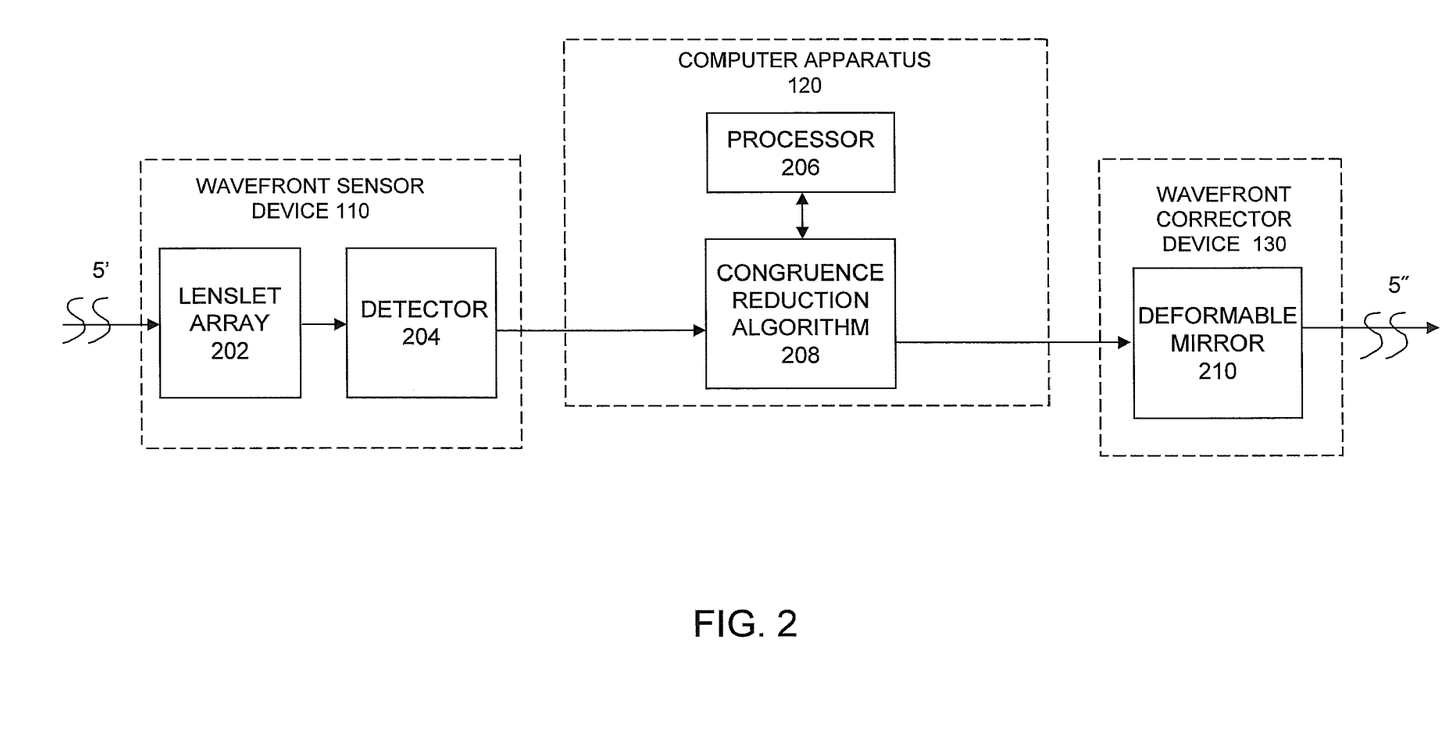
FIG. 2 is a further detailed block diagram of the optical system of FIG. 1 according to the present invention.

FIG. 2 is a further detailed block diagram of the optical system of FIG. 1 according to the present invention. The wavefront sensor device 110 includes a lenslet array 202 and detector 204. More specifically, the wavefront sensor device 110 is a Shack-Hartmann sensor as known to one skilled in the art. The array of lenses 202 dissects an incoming wavefront 5' and creates a pattern of focal spots on a detector 204. The detector 204 may be a photon sensor such as a charge couple device ("CCD"), avalanche photodiodes ("APD") or quad-cell. Focal spot data, which is the local tilt or slope of the wavefront across each lens, is calculated from the location of the focal spot on the detector 204. In other words, the shift in location of the focal spots reveals the average slope of the wavefront over the lenslet.

In one embodiment, the computer apparatus 120 includes a processor 206 that performs a congruence reduction algorithm 208. The computer apparatus 120 obtains the focal spot data from the wavefront sensor device 110 and subjects the focal spot data to the congruence reduction algorithm 208.

The congruence reduction algorithm 208 forms composite lenslets by reducing the data. In one embodiment according to the present invention, the congruence reduction algorithm is reduces the focal spot data by half to obtain composite lenslet data. The processor 206 of the computer apparatus 120 uses the composite lenslet data to calculate phase estimates for each of the actuators of the deformable mirror 210 of the wavefront corrector device 130. More specifically, the phase estimates are conditioned by the computer apparatus 120 to generate commands to be applied to each of the actuators of the deformable mirror 210. The actuators of the deformable mirror are adjusted according to the commands such that the wavefront 5" is reconstructed without distortions and degradation to produce the optical image.

Figure 3:
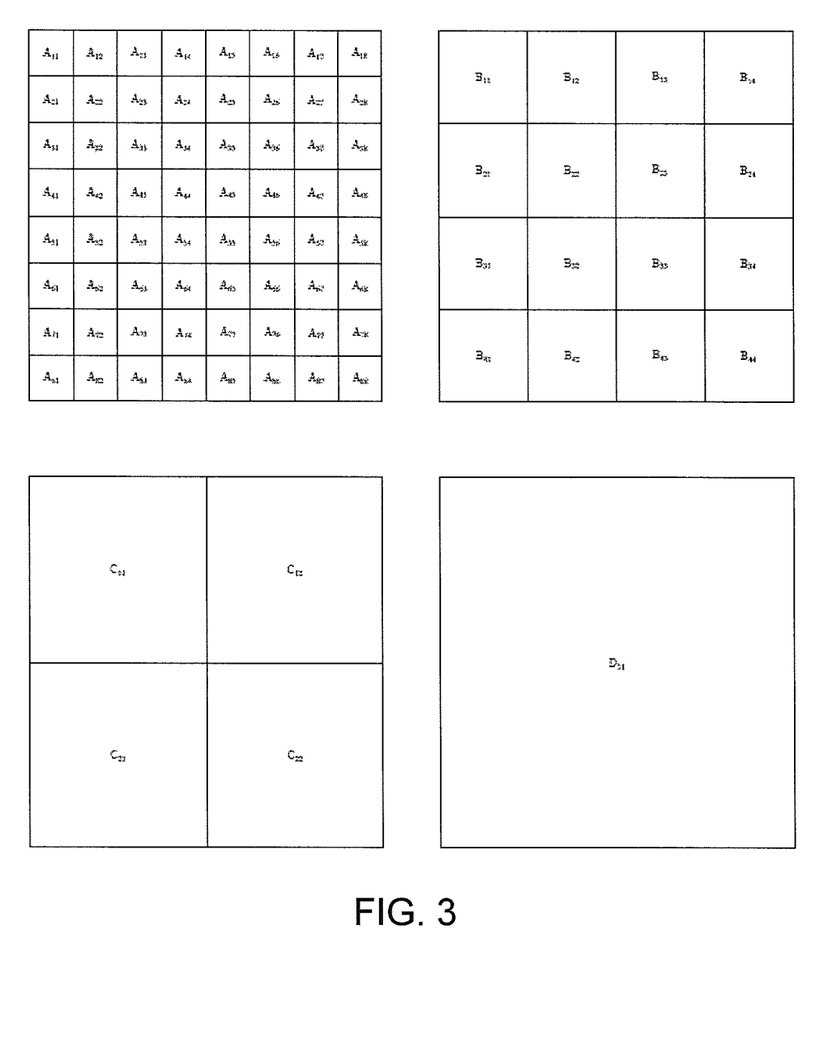
FIG. 3 illustrates a data set of one embodiment subject to the congruence reduction algorithm according to the present invention.

FIG. 3 illustrates a data set of one embodiment subject to the congruence reduction algorithm according to the present invention. In this embodiment, an 8×8 array represents the physical lenslet array, although any size lenslet array is contemplated. Each lenslet produces a focal spot and the shift of the focal spot location reveals the average slope of the wavefront over the lenslet.

As shown in FIG. 3, a series of three reductions halve the data at each step and all smaller arrays shown represent composite lenslets formed using the congruence reduction algorithm $X_r = C^T \times C$ according to the present invention. Congruence reduction works with the initial input as locations for each focal spot. Ideally many lenslets are desired to guarantee that the focal spot are distinct. Since the number of focal spots may be greater than the actuators, for example by factors of tens or hundreds, more data is gathered than can be used and compels the use of the present invention to form composite lenslets. Thus, the congruence reduction algorithm according to the present invention does not require the number of lenslets match the number of actuators of the wavefront corrector device.

As shown in FIG. 3, the original data of the 8×8 array is reduced by half through the three reductions to obtain the single slope measurement represented by the value $D_{11}$.

The congruence matrix C shapes and sculpts the data, which is an array of focal spot location shifts, coming from the wavefront sensor device. For example, X will describe the focal spot shift in the x direction.

The formation of the composite measurements can be seen by the block structure of the transformation. Consider the congruence matrix:

$$C = \frac{1}{2} \begin{pmatrix} 1 & 0 & 0 & 0 \\ 1 & 0 & 0 & 0 \\ 0 & 1 & 0 & 0 \\ 0 & 1 & 0 & 0 \\ 0 & 0 & 1 & 0 \\ 0 & 0 & 1 & 0 \\ 0 & 0 & 0 & 1 \\ 0 & 0 & 0 & 1 \end{pmatrix}$$

This 8×4 matrix will take an 8×8 input matrix and perform a 4 to 1 reduction over the entire array yielding an output 4×4 matrix. The congruence reduction algorithm is:

$$X_r = C^T \times C$$

where the variable r indexes the reduction.

In this case the matrix dimensions are:
A sample reduction is:

$$X_r = C^T X C$$

$$= \frac{1}{4} \begin{pmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{pmatrix} \begin{pmatrix} a_{11} & a_{12} & a_{13} & a_{14} & a_{15} & a_{16} & a_{17} & a_{18} \\ a_{21} & a_{22} & a_{23} & a_{24} & a_{25} & a_{26} & a_{27} & a_{28} \\ a_{31} & a_{32} & a_{33} & a_{34} & a_{35} & a_{36} & a_{37} & a_{38} \\ a_{41} & a_{42} & a_{43} & a_{44} & a_{45} & a_{46} & a_{47} & a_{48} \\ a_{51} & a_{52} & a_{53} & a_{54} & a_{55} & a_{56} & a_{57} & a_{58} \\ a_{61} & a_{62} & a_{63} & a_{64} & a_{65} & a_{66} & a_{67} & a_{68} \\ a_{71} & a_{72} & a_{73} & a_{74} & a_{75} & a_{76} & a_{77} & a_{78} \\ a_{81} & a_{82} & a_{83} & a_{84} & a_{85} & a_{86} & a_{87} & a_{88} \end{pmatrix} \begin{pmatrix} 1 & 0 & 0 & 0 \\ 1 & 0 & 0 & 0 \\ 0 & 1 & 0 & 0 \\ 0 & 1 & 0 & 0 \\ 0 & 0 & 1 & 0 \\ 0 & 0 & 1 & 0 \\ 0 & 0 & 0 & 1 \\ 0 & 0 & 0 & 1 \end{pmatrix}$$

-continued $$= \frac{1}{4}\begin{pmatrix} a_{11}+a_{12}+a_{21}+a_{22} & a_{13}+a_{14}+a_{23}+a_{24} & a_{15}+a_{16}+a_{25}+a_{26} & a_{17}+a_{18}+a_{27}+a_{28} \\ a_{31}+a_{32}+a_{41}+a_{42} & a_{33}+a_{34}+a_{43}+a_{44} & a_{35}+a_{36}+a_{45}+a_{46} & a_{37}+a_{38}+a_{47}+a_{48} \\ a_{51}+a_{52}+a_{61}+a_{62} & a_{53}+a_{54}+a_{63}+a_{64} & a_{55}+a_{56}+a_{65}+a_{66} & a_{57}+a_{58}+a_{67}+a_{68} \\ a_{71}+a_{72}+a_{81}+a_{82} & a_{73}+a_{74}+a_{83}+a_{84} & a_{75}+a_{76}+a_{85}+a_{86} & a_{77}+a_{78}+a_{87}+a_{88} \end{pmatrix}$$

The four measurements of X are grouped into a single measurement from a composite lens:

$$\frac{1}{4}\begin{pmatrix} 1 & 1 \end{pmatrix}\begin{pmatrix} a_{11} & a_{12} \\ a_{21} & a_{22} \end{pmatrix}\begin{pmatrix} 1 \\ 1 \end{pmatrix} = \frac{a_{11}+a_{12}+a_{21}+a_{22}}{4}$$

The matrix dimensions in this embodiment are:

$C^T \times C$: $1 \times 2 \cdot 2 \times 1 \rightarrow 1 \times 1$.

Focusing on the upper left-hand corners of FIG. 3, a series of $4 \rightarrow 1$ reductions is considered. The reductions halve the dimension of the input matrix:

$$A \rightarrow B \quad B_{11} = \frac{1}{4}(A_{11}+A_{12}+A_{21}+A_{22})$$

$$B \rightarrow C \quad C_{11} = \frac{1}{4}(B_{11}+B_{12}+B_{21}+B_{22})$$

$$C \rightarrow D \quad D_{11} = \frac{1}{4}(C_{11}+C_{12}+C_{21}+C_{22})$$

The congruence reductions have the same form across all sizes and is an averaging process. In embodiments that utilize a Shack-Hartmann sensor, this averaging is an exact average of the averages since each lenslets reveals the average of the wavefront slope over the lenslet.

Instead of going from A→B→C, a single congruence reduction leads directly from A→C. This corresponds to a $16 \rightarrow 1$ process.

$$c_{11} = \frac{1}{4}(B_{11}+B_{12}+B_{21}+B_{22})$$
$$= \frac{1}{16}(A_{11}+A_{12}+A_{21}+A_{22}+A_{13}+A_{14}+A_{23}+A_{24}+A_{31}+$$
$$A_{32}+A_{41}+A_{42}+A_{33}+A_{34}+A_{43}+A_{44})$$

Explicit forms of the congruence matrices C are as follows:

$8 \times 8 \rightarrow 4 \times 4$ $$\frac{1}{4}\begin{pmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{pmatrix}\begin{pmatrix} * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \end{pmatrix}\begin{pmatrix} 1 & 0 & 0 & 0 \\ 1 & 0 & 0 & 0 \\ 0 & 1 & 0 & 0 \\ 0 & 1 & 0 & 0 \\ 0 & 0 & 1 & 0 \\ 0 & 0 & 1 & 0 \\ 0 & 0 & 0 & 1 \\ 0 & 0 & 0 & 1 \end{pmatrix} = \begin{pmatrix} * & * & * & * \\ * & * & * & * \\ * & * & * & * \\ * & * & * & * \end{pmatrix}$$

$4 \times 4 \rightarrow 2 \times 2$ $$\frac{1}{4}\begin{pmatrix} 1 & 1 & 0 & 0 \\ 0 & 0 & 1 & 1 \end{pmatrix}\begin{pmatrix} * & * & * & * \\ * & * & * & * \\ * & * & * & * \\ * & * & * & * \end{pmatrix}\begin{pmatrix} 1 & 0 \\ 1 & 0 \\ 0 & 1 \\ 0 & 1 \end{pmatrix} = \begin{pmatrix} * & * \\ * & * \end{pmatrix}$$

$2 \times 2 \rightarrow 1 \times 1$ $$\frac{1}{4}\begin{pmatrix} 1 & 1 \end{pmatrix}\begin{pmatrix} * & * \\ * & * \end{pmatrix}\begin{pmatrix} 1 \\ 1 \end{pmatrix} = (*)$$

$8 \times 8 \rightarrow 2 \times 2$ $$\frac{1}{16}\begin{pmatrix} 1 & 1 & 1 & 1 & 0 & 0 & 0 & 0 \\ 0 & 0 & 0 & 0 & 1 & 1 & 1 & 1 \end{pmatrix}$$

$$\begin{pmatrix} * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \end{pmatrix}\begin{pmatrix} 1 & 0 \\ 1 & 0 \\ 1 & 0 \\ 1 & 0 \\ 0 & 1 \\ 0 & 1 \\ 0 & 1 \\ 0 & 1 \end{pmatrix} = \begin{pmatrix} * & * \\ * & * \end{pmatrix}$$

shown by:

$$\frac{1}{16}\begin{pmatrix} 1 & 1 & 1 & 1 & 0 & 0 & 0 & 0 \\ 0 & 0 & 0 & 0 & 1 & 1 & 1 & 1 \end{pmatrix} \times \begin{pmatrix} 4.64016 & 4.64013 & 4.64011 & 4.64009 & 4.64008 & 4.64008 & 4.64008 & 4.65009 \\ 3.6801 & 3.68008 & 3.68006 & 3.68005 & 3.68004 & 3.68004 & 3.68004 & 3.68005 \\ 2.72006 & 2.72005 & 2.72003 & 2.72002 & 2.72002 & 2.72002 & 2.72002 & 2.72003 \\ 1.76003 & 1.76002 & 1.76001 & 1.76001 & 1.76001 & 1.76 & 1.76001 & 1.76001 \\ 0.800014 & 0.800009 & 0.800005 & 0.800003 & 0.800001 & 0.800001 & 0.800001 & 0.800003 \\ -0.160003 & -0.160002 & -0.160001 & -0.16 & -0.16 & -0.16 & -0.16 & -0.160001 \\ -1.12002 & -1.12001 & -1.12001 & -1.12 & -1.12 & -1.12 & -1.12 & -1.12001 \\ -2.08004 & -2.08003 & -2.08002 & -2.08001 & -2.08001 & -2.08001 & -2.08001 & -2.08001 \end{pmatrix} \times \begin{pmatrix} 1 & 0 \\ 1 & 0 \\ 1 & 0 \\ 1 & 0 \\ 0 & 1 \\ 0 & 1 \\ 0 & 1 \\ 0 & 1 \end{pmatrix} =$$

$8 \times 8 \rightarrow 1 \times 1$ $$\frac{1}{64}(1\ 1\ 1\ 1\ 1\ 1\ 1\ 1)\begin{pmatrix} * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \\ * & * & * & * & * & * & * & * \end{pmatrix}\begin{pmatrix} 1 \\ 1 \\ 1 \\ 1 \\ 1 \\ 1 \\ 1 \\ 1 \end{pmatrix} = (*)$$

shown by:

$$\frac{1}{64}(1\ 1\ 1\ 1\ 1\ 1\ 1\ 1) \times \begin{pmatrix} 4.64016 & 4.64013 & 4.64011 & 4.64009 & 4.64008 & 4.64008 & 4.64008 & 4.65009 \\ 3.6801 & 3.68008 & 3.68006 & 3.68005 & 3.68004 & 3.68004 & 3.68004 & 3.68005 \\ 2.72006 & 2.72005 & 2.72003 & 2.72002 & 2.72002 & 2.72002 & 2.72002 & 2.72003 \\ 1.76003 & 1.76002 & 1.76001 & 1.76001 & 1.76001 & 1.76 & 1.76001 & 1.76001 \\ 0.800014 & 0.800009 & 0.800005 & 0.800003 & 0.800001 & 0.800001 & 0.800001 & 0.800003 \\ -0.160003 & -0.160002 & -0.160001 & -0.16 & -0.16 & -0.16 & -0.16 & -0.160001 \\ -1.12002 & -1.12001 & -1.12001 & -1.12 & -1.12 & -1.12 & -1.12 & -1.12001 \\ -2.08004 & -2.08003 & -2.08002 & -2.08001 & -2.08001 & -2.08001 & -2.08001 & -2.08001 \end{pmatrix} \times \begin{pmatrix} 1 \\ 1 \\ 1 \\ 1 \\ 1 \\ 1 \\ 1 \\ 1 \end{pmatrix} = (1.28002)\ \checkmark$$

$8 \times 8 \rightarrow 4 \times 4 \rightarrow 2 \times 2 \rightarrow 1 \times 1$ As shown in another embodiment with an incident wavefront of:

$$\phi(x, y) = \sqrt{R^2 - (x - x_0)^2 - (y - y_0)^2}$$

$$\begin{pmatrix} 3.20006 & 3.20004 \\ -0.640008 & -0.640003 \end{pmatrix} \checkmark$$

$$= \sqrt{(2 \times 10^5)^2 - (x - 10)^2 - (y - 64)^2}$$

The following illustrates composite lenslets using congruence reduction:

$$B^T = \frac{1}{2}\begin{pmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{pmatrix}$$

$$\delta_{y8} = \begin{pmatrix} 4.64016 & 4.64013 & 4.64011 & 4.64009 & 4.64008 & 4.64008 & 4.64008 & 4.65009 \\ 3.6801 & 3.68008 & 3.68006 & 3.68005 & 3.68004 & 3.68004 & 3.68004 & 3.68005 \\ 2.72006 & 2.72005 & 2.72003 & 2.72002 & 2.72002 & 2.72002 & 2.72002 & 2.72003 \\ 1.76003 & 1.76002 & 1.76001 & 1.76001 & 1.76001 & 1.76 & 1.76001 & 1.76001 \\ 0.800014 & 0.800009 & 0.800005 & 0.800003 & 0.800001 & 0.800001 & 0.800001 & 0.800003 \\ -0.160003 & -0.160002 & -0.160001 & -0.16 & -0.16 & -0.16 & -0.16 & -0.160001 \\ -1.12002 & -1.12001 & -1.12001 & -1.12 & -1.12 & -1.12 & -1.12 & -1.12001 \\ -2.08004 & -2.08003 & -2.08002 & -2.08001 & -2.08001 & -2.08001 & -2.08001 & -2.08001 \end{pmatrix}$$

$$B = \frac{1}{2}\begin{pmatrix} 1 & 0 & 0 & 0 \\ 1 & 0 & 0 & 0 \\ 0 & 1 & 0 & 0 \\ 0 & 1 & 0 & 0 \\ 0 & 0 & 1 & 0 \\ 0 & 0 & 1 & 0 \\ 0 & 0 & 0 & 1 \\ 0 & 0 & 0 & 1 \end{pmatrix}$$

-continued $$B^T \delta_{y8} B = \delta_{y4} = \begin{pmatrix} 4.16012 & 4.16008 & 4.16006 & 4.16007 \\ 2.24004 & 2.24002 & 2.24001 & 2.24002 \\ 0.320005 & 0.320002 & 0.32 & 0.320001 \\ -1.60003 & -1.60001 & -1.6 & -1.60001 \end{pmatrix}$$

$$B^T = \frac{1}{2}\begin{pmatrix} 1 & 1 & 0 & 0 \\ 0 & 0 & 1 & 1 \end{pmatrix}$$

$$\delta_{y4} = \begin{pmatrix} 4.16012 & 4.16008 & 4.16006 & 4.16007 \\ 2.24004 & 2.24002 & 2.24001 & 2.24002 \\ 0.320005 & 0.320002 & 0.32 & 0.320001 \\ -1.60003 & -1.60001 & -1.6 & -1.60001 \end{pmatrix}$$

$$B = \frac{1}{2}\begin{pmatrix} 1 & 0 \\ 1 & 0 \\ 0 & 1 \\ 0 & 1 \end{pmatrix}$$

$$B^T \delta_{y4} B = \delta_{y2} = \begin{pmatrix} 3.20006 & 3.20004 \\ -0.640008 & -0.640003 \end{pmatrix}$$

$$B^T = \frac{1}{2}(1 \quad 1)$$

$$\delta_{y2} = \begin{pmatrix} 3.20006 & 3.20004 \\ -0.640008 & -0.640003 \end{pmatrix}$$

$$B = \frac{1}{2}\begin{pmatrix} 1 \\ 1 \end{pmatrix}$$

$$B^T \delta_{y2} B = \delta_{y1} = 1.28002$$

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A method of reducing distortion and degradation within an optical system comprising the steps of:
   introducing a wavefront to a lenslet array of a wavefront sensor device to produce a plurality of focal spots;
   determining a shift in the plurality of focal spots on a detector of the wavefront sensor device to obtain focal spot data revealing an average slope of the wavefront over the lenslet array;
   processing by a processor of a computer apparatus the focal spot data using a congruence reduction algorithm, wherein the congruence reduction algorithm includes a linear transformation that reduces the focal spot data to obtain reduced focal spot data;
   forming composite lenslet data from the reduced focal spot data;
   utilizing the composite lenslet data to adjust the wavefront corrector device; and
   reconstructing the wavefront to produce an optical image of an object.

2. The method reducing distortion and degradation within an optical system according to claim 1 wherein the congruence reduction algorithm is $X_r = C^T \times C$, wherein C is a congruence matrix, $C^T$ is a transformation of the congruence matrix, X is the shift in the plurality of focal spots in the x-direction, and r is an index of the congruence reduction.

3. The method reducing distortion and degradation within an optical system according to claim 1 wherein the wavefront sensor device is a Shack-Hartmann sensor device.

4. The method reducing distortion and degradation within an optical system according to claim 1 wherein the wavefront corrector device is a deformable mirror including a plurality of actuators.

5. An optical system to reduce distortion and degradation of a reconstructed wavefront, comprising:
   a wavefront sensor device including a lenslet array and a detector, wherein a wavefront is pixellated by the lenslet array into a plurality of focal spots on the detector forming focal spot data, wherein the focal spot data includes a shift in location of each of the focal spots of the plurality of focal spots;
   a computer apparatus including a processor, wherein the processor utilizes a congruence reduction algorithm that reduces the focal spot data in half using an exact set of linear transformations to obtain to form composite lenslet data;
   a wavefront corrector device, wherein the computer apparatus commands adjustments to the wavefront corrector device according to the composite lenslet data in order to reconstruct the wavefront forming the reconstructed wavefront.

6. The optical system to reduce distortion and degradation of a reconstructed wavefront according to claim 5 wherein the congruence reduction algorithm is $X_r = C^T \times C$ wherein C is a congruence matrix, $C^T$ is a transformation of the congruence matrix, X is the shift in the plurality of focal spots in the x-direction, and r is an index of the congruence reduction.

7. The optical system to reduce distortion and degradation of a reconstructed wavefront according to claim 5 wherein the wavefront sensor device is a Shack-Hartmann sensor device.

8. The method reducing distortion and degradation within an optical system according to claim 5 wherein the wavefront corrector device is a deformable mirror with a plurality of actuators such that the computer apparatus commands each actuator of the plurality to adjust according to the composite lenslet data in order to reconstruct the wavefront forming the reconstructed wavefront.

* * * * *